Oct. 24, 1950        C. E. ADAMS        2,527,051
CONTROL MECHANISM FOR HYDRAULIC APPARATUS
Filed Sept. 28, 1944        5 Sheets-Sheet 1

INVENTOR
Cecil E. Adams
BY
Herschel C. Omohundro
ATTORNEY

Oct. 24, 1950            C. E. ADAMS            2,527,051

CONTROL MECHANISM FOR HYDRAULIC APPARATUS

Filed Sept. 28, 1944            5 Sheets-Sheet 2

INVENTOR
Cecil E. Adams
BY
Herschel C. Omohundro
ATTORNEY

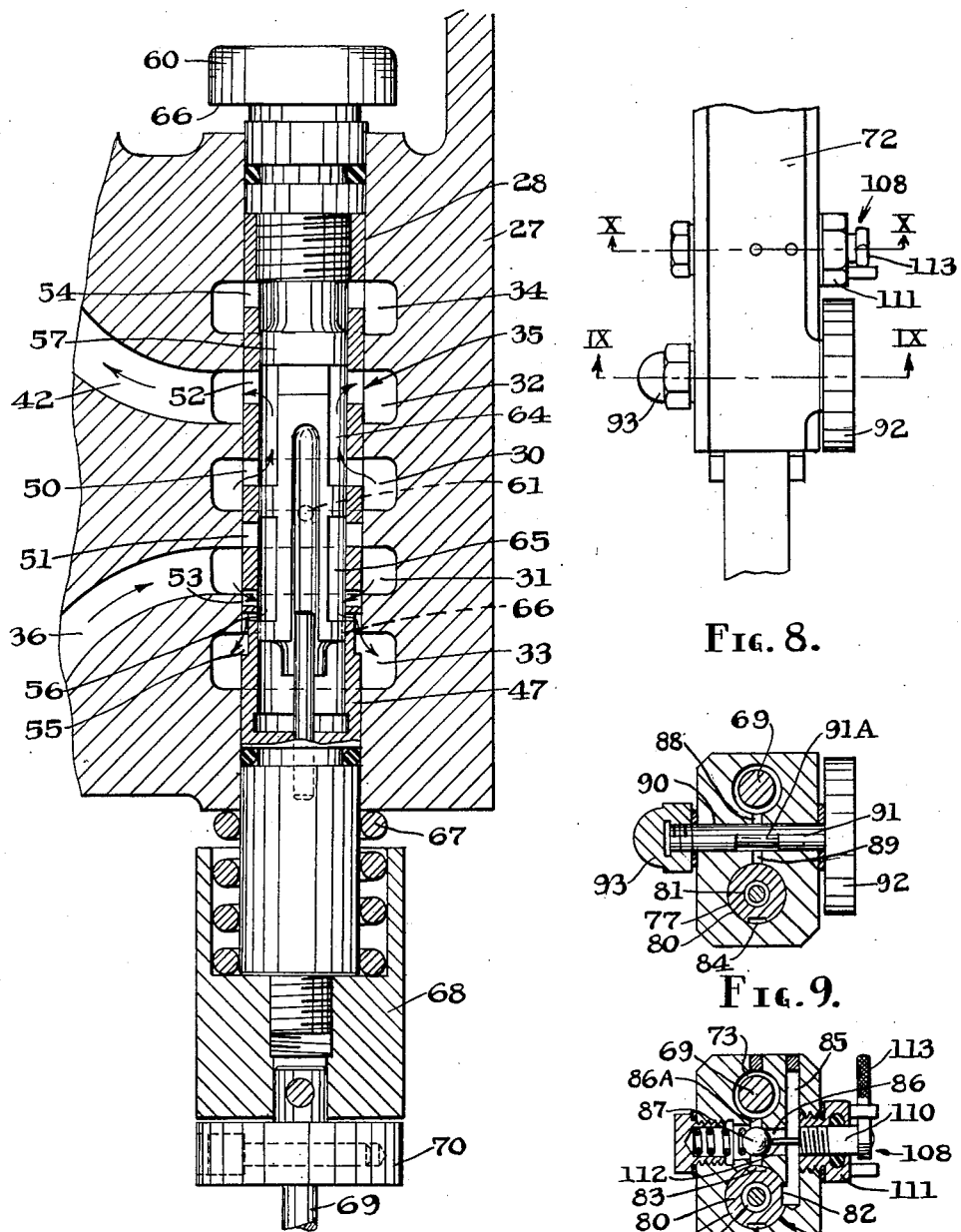

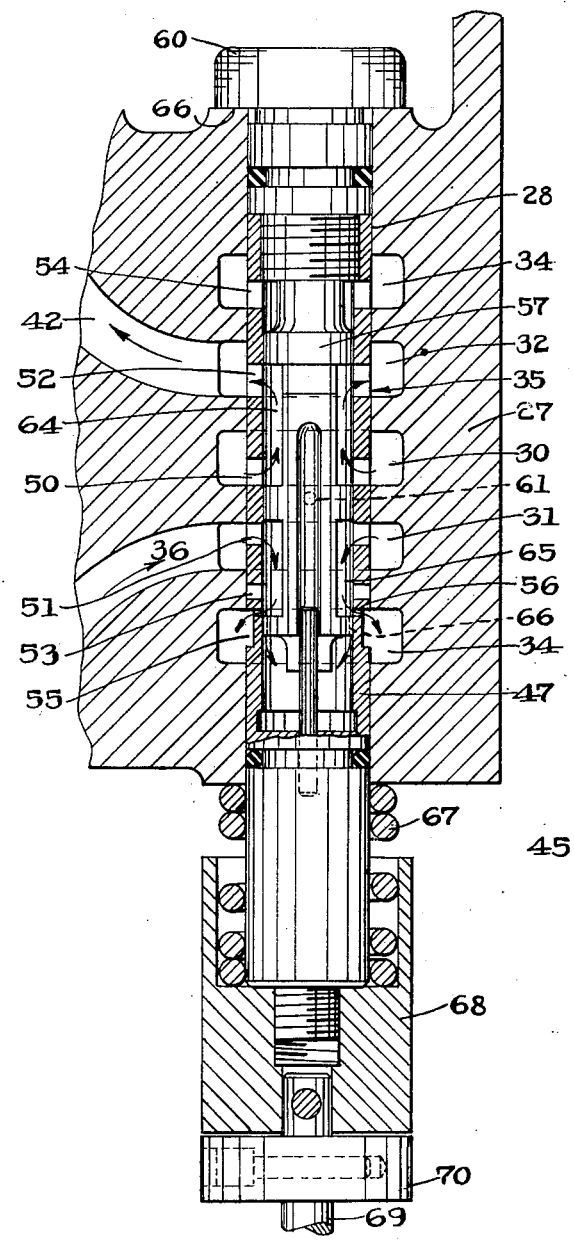

Oct. 24, 1950 — C. E. ADAMS — 2,527,051
CONTROL MECHANISM FOR HYDRAULIC APPARATUS
Filed Sept. 28, 1944 — 5 Sheets-Sheet 5

INVENTOR
Cecil E. Adams
BY
Herschel C. Omohundro
ATTORNEY

Patented Oct. 24, 1950

2,527,051

UNITED STATES PATENT OFFICE 2,527,051

CONTROL MECHANISM FOR HYDRAULIC APPARATUS

Cecil E. Adams, Columbus, Ohio, assignor to The Denison Engineering Company, Columbus, Ohio, a corporation of Ohio Application September 28, 1944, Serial No. 556,182

14 Claims. (Cl. 121—38)

This invention relates generally to machine tools and is more particularly directed to mechanism for controlling the operation of such tools.

One of the objects of this invention is to provide a machine tool having a movable member and means for controlling such member to cause it to perform certain desired operations.

Another object of the invention is to provide a machine having a reciprocatory member and control means therefor which will cause the member to move in a certain direction, rapidly reciprocate or vibrate after moving in such direction and then return to starting position.

An object also is to provide a press having a reciprocatory ram and control means therefor which will cause the ram to be urged in a desired direction with a predetermined force, rapidly apply a series of impulses of the same force in the desired direction and return to initial or starting position and condition at the termination of either a desired interval of time or the application of a predetermined number of impulses.

A further object is to provide a hydraulically operated member having a control mechanism actuated in part by the member to cause the same to reciprocate automatically and to provide the control mechanism with means which so affects its operation as to vary the length of travel of the member.

A still further object is to provide a hydraulic press having a piston disposed for reciprocation in a chamber into which fluid under pressure is introduced, the press also having a control valve mechanism which is operated by the piston in reciprocating, to govern the flow of fluid to the chamber whereby the piston will automatically reciprocate until stopped by the operator, the press being further modified by the addition of means which causes the control valve to operate in such a manner that the piston will rapidly and repeatedly reverse its direction of movement at a desired point in the normal travel thereof.

It is also an object of the invention to provide a machine of the character mentioned in the preceding paragraph which will have a ram capable of moving an indefinite distance in a direction toward an article of work, impart a series of thrusts to the article to effect possible compaction thereof, and withdraw from the article to the initial or starting position.

Another object of the invention is to provide a hydraulic press having a ram and mechanism for supplying fluid pressure to a power unit with which the ram is connected to cause the ram to move back and forth, the fluid supply mechanism having a control valve which is actuated by the ram to reverse the direction of movement of the ram, movement being transmitted from the ram to the control valve by a device hereinafter referred to as a shipper rod or control valve actuating device, this member having means associated therewith to repeatedly reverse the direction of movement of the ram irrespective of the point, in the normal travel, at which the ram is then located, the shipper rod also having means to regulate the time period in which the reversing operations are performed.

An object also is to provide a shipper rod or control valve actuating device which includes a plurality of members capable of relative movement and providing means in connection with the members to interrupt the relative movement in one direction so that the control valve will be actuated in a certain manner when the apparatus controlled thereby is in a predetermined condition.

An object also consists in providing a machine suitable for use in compacting powdered or other materials, the machine having a cylinder operated by fluid pressure, which cylinder is provided with a ram, a novel control valve mechanism being provided to govern the flow of fluid pressure to the cylinder whereby the ram will automatically reciprocate, a valve actuating device also being provided which so operates the valve that the return or reverse motion of the ram will be temporarily shortened with the result of causing the ram to impart a series of short thrusts to the material being operated upon at the capacity of the machine before the ram returns to the starting position. The control actuating device is so formed that the series of sharp thrusts will be imparted regardless of the degree of compaction of the material or the length of travel of the ram, thus the mechanism will operate with equal facility whether the material may be readily compacted to a high degree or strenuously resist compaction.

Part of the control mechanism, namely the means for effecting the automatic reciprocation of the piston and ram, form the subject matter of my copending application Serial Number 545,701, filed July 19, 1944, now Patent No. 2,470,086, granted May 17, 1949, entitled "Hydraulic Apparatus," of which this application is a continuation-in-part.

Further objects and advantages of the present invention will be apparent from the following description, reference being had to the accompanying drawing wherein a preferred form of embodiment of the invention is clearly shown.

In the drawings:

Figure 3 is a similar view showing a movable part of the mechanism in a position different from that shown in Figure 2;

Figure 4 is also a similar view showing the control mechanism in still another position of movement;

Figure 8 is a front elevational view of a portion of the control mechanism;

Figure 9 is a detail horizontal sectional view taken through the control mechanism on the plane indicated by the line IX—IX of Figure 8;

Figure 10 is a similar view on the plane indicated by the line X—X of Figure 8.

Figures 1, 11:
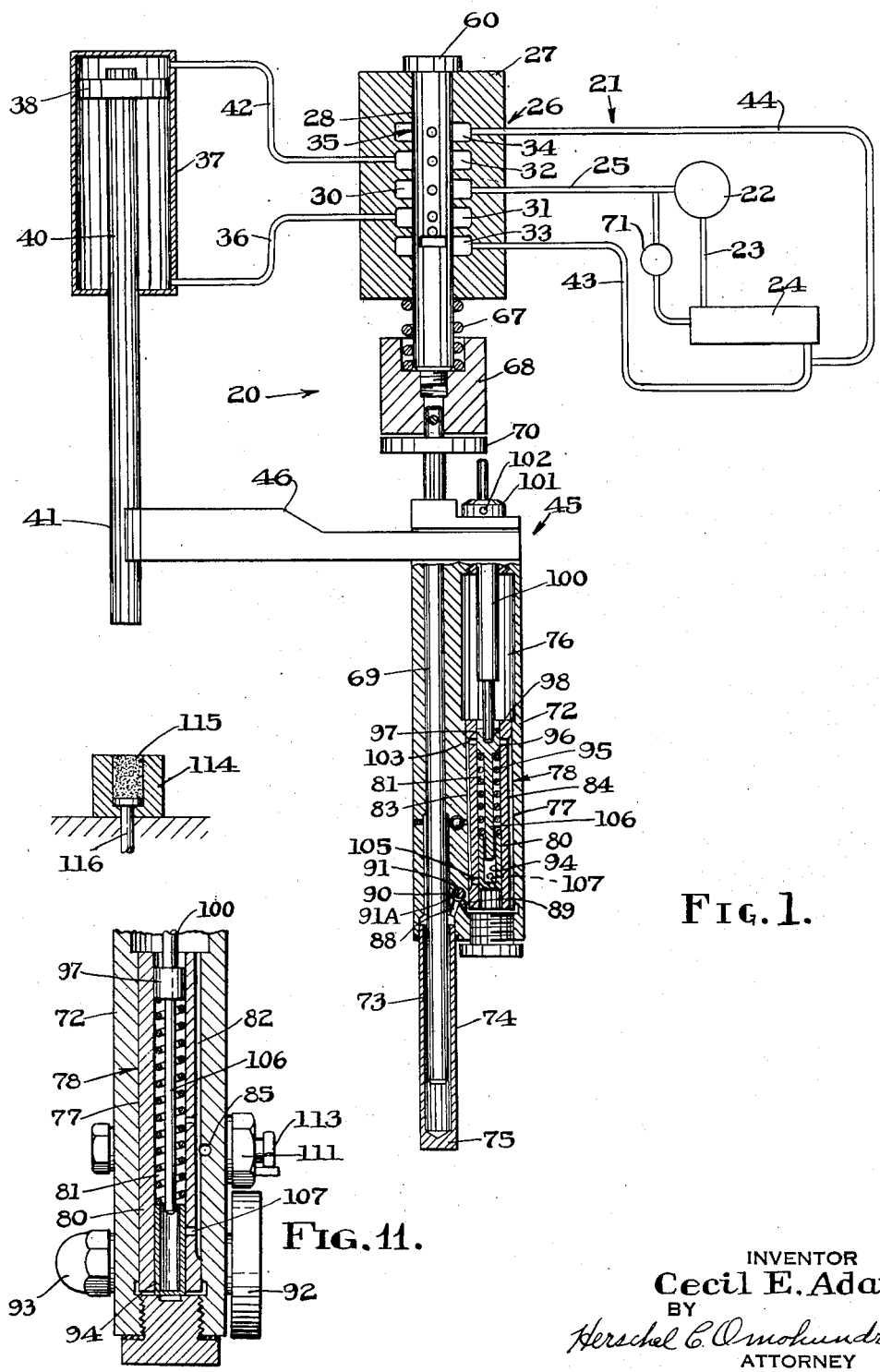
Figure 1 is a diagrammatic view of a hydraulic system in which the control mechanism forming the subject matter of the invention has been incorporated.
Figure 11 is a detail vertical sectional view taken on the plane indicated by the line XI—XI of Figure 5.

Referring more particularly to the drawings, the control apparatus has been illustrated as applied to a hydraulically operated ram. As shown in Figure 1, the control mechanism, indicated generally by the numeral 20, is connected in the hydraulic circuit 21 of the ram. This circuit includes a pump 22 which is connected by a line 23 with a tank 24, fluid being drawn from the tank by the pump and forced through a conduit 25 to a valve mechanism 26 of the type set forth in my copending application mentioned above. Generally, this valve mechanism includes a casing 27 having an internal bore 28 and a plurality of chambers 30—31—32—33—34, spaced longitudinally thereof. The chamber 30 is in direct communication with the line 25 to receive fluid under pressure from the pump 22. The bore in the casing 27 receives a valve mechanism, designated generally by the numeral 35, which is employed to control the flow of hydraulic fluid from the chamber 30 to the chambers 31 and 32 and from the latter chambers to chambers 33 and 34 respectively.

When the valve mechanism 35 is in position to direct fluid flow from chamber 30 to chamber 31, fluid under pressure will be conducted by line 36 to the lower end of a power cylinder 37. This fluid will exert a force on the underside of a piston 38 disposed for movement in the cylinder and cause this piston to move in an upward direction. This piston is connected by piston rod 40 with the ram 41. When the valve mechanism 35 is in such a position as to connect chambers 30 and 32, fluid will be directed to the upper end of the power cylinder 37, through line 42 to cause the piston 38 to descend in the cylinder. When the valve mechanism is in position to connect one of chambers 31 or 32 with chamber 30 it will also connect the other chamber with the adjacent outlet chamber 33 or 34 so that as fluid is admitted to one end of the power cylinder, the opposite end will be connected with the fluid reservoir 24, outlet chambers 33 and 34 communicating with the reservoir by lines 43 and 44 respectively. It should be apparent from the foregoing that through the manipulation of the valve mechanism 35 the power unit can be caused to raise and lower the ram as desired.

As in the copending application referred to, the valve mechanism is automatically actuated to effect repeated reciprocation of the ram. To perform this operation, the valve mechanism is provided with a shipper rod mechanism indicated generally by the numeral 45, this mechanism being connected to the lower end of the valve mechanism 35. Motion is transmitted to the shipper rod mechanism by the ram 41 through a fork 46, which is rigidly secured to the ram and engages a portion of the shipper rod mechanism. Through this connection the valve mechanism will be actuated when the ram is raised or lowered, the valve mechanism being shifted to a position to direct fluid to the upper end of the power cylinder when the ram is elevated and set to direct fluid to the lower end of the power cylinder, after the ram has moved a predetermined distance in a downward direction and certain conditions exist in the system. A portion of the operation of the valve mechanism is automatic in that it is not entirely dependent on the movement of the shipper rod for its actuation. Although the valve mechanism has been shown and described in detail in the copending application mentioned above, it is believed desirable to include a portion of the description herein to facilitate the understanding of the present invention.

The casing 27, as illustrated in Figures 2 to 5 inclusive, has the chambers 30 to 34 inclusive disposed in vertically spaced order along the bore 28. The chamber 30 is arranged between cylinder chambers 31 and 32 while outlet chambers 33 and 34 are disposed on the opposite sides of the cylinder chambers from the high pressure chamber 30. The movable portion 35 of the valve mechanism includes a sleeve member 47 which is slidably positioned in the bore and has a series of laterally extending ports 50 to 54 inclusive formed in the sidewall thereof. These ports are so arranged that certain ones thereof will communicate at all times with certain of the chambers in the casing 27. For example: Port 50 will at all times communicate with chamber 30 to receive fluid under pressure therefrom. Port 52 will continuously communicate with chamber 32 and port 54 with chamber 34. Port 51 in the sleeve is so located that when the sleeve is elevated to the position shown in Figures 2 and 3, communication between this port and chamber 31 will be interrupted. When the sleeve 47 is in a lowered position, shown in Figures 4 and 5, ports 51 will be connected with ports 31 to permit fluid to flow either into or out of the lower end of the power cylinder. The lower portion of the sleeve 47 is also provided with an annular groove 55 and small ports 56 extending from said groove to the interior of the sleeve. The purpose of these ports and the groove will appear as the description proceeds.

The interior of the sleeve slidably receives a shuttle member 57, which is urged toward the lowered position in the sleeve by a coil spring 58 which has one end disposed in a pocket in the upper end of the shuttle and the other end arranged in a socket formed in a cap member 59 which is threaded into the upper end of the sleeve. The spring 58 normally holds the shuttle in a lowered position. When the ram is at rest in an elevated position, the valve ports will be in the positions shown in Figure 2, sleeve 47 being held in an elevated position and shuttle 57 in its lowered position. During the time sleeve 47 is elevated, additional ports 61 in the sleeve register with pressure chamber 30 and when fluid under pressure is supplied to this chamber, it will flow through ports 51 into channels 63 formed in the shuttle 57 and from these channels to the interior of the sleeve 47 below the shuttle. Since the lower end of the sleeve is closed, this fluid exerts pressure on the underside of the shuttle to move it upwardly, in opposition to the spring 58, to the position shown in Fig. 3. At this time, grooves 64 in the shuttle connect ports 50 and 52 to provide for a flow of fluid under pressure from chamber 30 to the upper end of the power cylinder through line 42 to cause downward movement of the ram. The initial downward movement causes fluid to flow from the lower end of the cylinder 37 to the chamber 31, from which it will flow through ports 53 to grooves 65 provided in the shuttle. Since the only outlet from the grooves 65 in this position of the mechanism is through the restricted ports 56 and groove 55 to the outlet chamber 33 a back pressure will be generated which will be transmitted by notches 66 formed in the shuttle, to the underside of the shuttle. This pressure serves to hold the shuttle in its uppermost position when downward movement of the ram permits the sleeve 47 to return to its lowermost position, determined by shoulder 66, and prevent communication between chamber 30 and ports 61. The valve mechanism will then occupy the positions shown in Figure 4, in which grooves 64 connect ports 50 and 52 and grooves 65 connect ports 51 and 56. At this time ports 53, which are provided to permit limited fluid flow from the cylinder 37 when sleeve 47 is elevated, will be blocked. With the valve mechanism so set, fluid under pressure will continue to flow from the pressure chamber 30 through the ports 50, grooves 64, ports 52 and line 42 to the upper end of cylinder 37, causing the piston 38 to continue to move downwardly. This movement will cause fluid to be expelled from the lower end of the cylinder through line 36, chamber 31, ports 51, grooves 65 and ports 56 to outlet chamber 33, with the resulting admission of pressure to the under side of the shuttle 57 to hold the same in its upper position where it will remain as long as back pressure exists. When the ram stops, due to reaching the end of its travel or an obstruction which offers sufficient resistance, the back pressure falls, permitting the spring 58 to expand and move shuttle 57 to its normal lowered position. The parts of the valve will then be in the positions shown in Figure 5.

At this time, the port 51 is in communication with chamber 31. When the parts are thus disposed, fluid under pressure may flow from the inlet chamber 30 through ports 50, grooves 64, ports 51 and line 36 to the lower end of the power cylinder 37. This fluid will cause the piston in the power cylinder to move upwardly and expel fluid from the upper end of the cylinder 37 through line 42, chamber, 32, ports 52, the interior of the sleeve 47, through ports 54 to chamber 34 from which the fluid will flow through line 44 to the tank 24. When the ram approaches the upper limit of its travel, the shipper rod will move the valve mechanism upwardly to the position shown in Figure 2. When this position is reached, ports 51 will be disposed out of registration with the chamber 31 and the flow of fluid under pressure to the lower end of the cylinder 37 will be discontinued. The upward movement of the ram will thereby be terminated. At this time the additional ports 61 in the sleeve will again communicate with the pressure chamber 30 and fluid under pressure will flow through these ports into the channels 63 formed in the shuttle member to initiate a new cycle of operations.

As the ram starts its downward movement the sleeve 47 is returned to its lowered position by the spring 67, which is disposed between the bottom wall of the casing 27 and a spring block 68 threadedly secured to the lower end of the sleeve member 47. The reciprocation of the ram will be continued until the flow of fluid to the control mechanism is interrupted.

It will be seen from the foregoing that the reciprocation of the ram, when fluid is admitted under pressure to the control mechanism, is entirely automatic.

The shipper rod mechanism 45 is connected with the valve mechanism 35 through the connection of a rod 69 forming a part of the shipper rod mechanism, with the spring block 68. This rod 69 receives a disk 70 which is clamped to the rod so that the disk may be adjusted lengthwise thereof to vary the extent of upward movement of the ram, by changing the point in the travel thereof at which the valve mechanism 35 will be moved upwardly to cause the ram to reverse its direction of movement. The length of travel of the ram in an upward direction being dependent upon the position of the disk 70 on the rod 69 and in a downward direction by the presence or absence of an obstruction in the path thereof. If an obstruction is encountered by the ram, which obstruction will exert sufficient resistance to the movement of the ram to cause the pressure to build up in the system to a value at which a relief valve 71, disposed in the line 25 between the pump and the valve mechanism, will spill fluid from the pump to the tank 24, the ram will stop moving. At this time, the ram will be exerting the total force for which the mechanism is adjusted, on the obstruction. When the ram stops moving downwardly, the back pressure in the lower end of the cylinder 37, line 36, chamber 31, grooves 65 and in the lower end of the sleeve 47 below the shuttle will fall, due to the escape of fluid through restricted ports 56, grooves 55, outlet chamber 33 and line 43 to tank 24, permitting spring 58 to return shuttle 57 to lowered position. In so moving, the shuttle will force fluid beneath the same outward through the notches 66, grooves 65, restricted ports 56, grooves 55, outlet chamber 33 and line 43 to tank 24. When the shuttle is in its lowered position, fluid under pressure will be admitted to the lower end of cylinder 37 to cause the ram to return to a normal elevated position.

As pointed out in the objects of the invention, it has been found desirable to secure a certain sequence of operations of the ram, namely, the descent thereof. the performance of a series of short reciprocations and the return of the ram to an initial or starting position. To effect this sequence of operations. the shipper rod mechanism 45 has been developed. This mechanism includes the rod member 69 which is secured at its upper end to the spring block 68 and a body member 72 in which the rod 69 is slidably received. the lower end of the rod projecting into a chamber 73, provided by a tubular member 74 which depends from the body 72. The member 74 is closed at its lower end as at 75. The body 72 also includes a chamber 76 for the reception of hydraulic fluid, and a compartment 77 below this chamber to receive a timing mechanism designated generally by the numeral 78.

This timing mechanism 78 includes a cylindrical body 80, having a longitudinally extending central opening 81 and a plurality of slots 82, 83 and 84 formed in the outer surface thereof. The slot 82 extends from a point adjacent the lower end to the upper end of the cylinder 80 and communicates with the chamber 76. This slot conducts fluid from the chamber 76 to a passage 85 formed in the member 72 and connected with another passage 86 in which a check valve 87 is disposed. The passage 86 also connects with a passage 86A which in turn connects with compartment 77 and the chamber 73 so that fluid may flow from the chamber 76 through the groove 82, passages 85, 86 and 86A to the chamber 73. This flow will take place when the rod 69 moves outwardly in the chamber 73, the flow of fluid being due both to the force of gravity and the suction caused by the withdrawal of the rod 69 from the chamber. To effect such withdrawal the body 72 is connected with the ram 41 by the fork 46 so that as the ram moves downwardly the body 72 will be carried therewith, while the rod 69 is held against downward movement by the engagement of the shoulder 66 with the upper surface of the casing 27.

As illustrated in Figures 1, 4, 5 and 9 the body 72 is also formed with a pair of angularly related passages 88 and 89, the first of which leads from the chamber 73 to a valve bore 90, while the latter leads from this bore to the lower end of the compartment 77. The bore 90 receives a rotatable valve member 91 which is provided at one end with a knob 92 for effecting its adjustment, and at the opposite end with an acorn nut 93 to retain the valve in its assembled relation with the body 72. The intermediate portion of the valve 91 has an eccentric section 91A which registers with the adjoining ends of the passages 88 and 89. Through the adjustment of the valve 91 the volume of fluid permitted to flow through the passages 88 and 89 may be varied. It will be seen that after the ram has moved to its lowest possible position and an upward movement is initiated, the return of the rod 69 into the chamber 73 will also start. This initial inward movement of the rod generates pressure in the fluid in the chamber and since reverse flow through passages 86, 86A and 85 is prevented by the check valve 87, this fluid will tend to return to the reservoir 76 through passages 88 and 89. The return of fluid by this path is governed by the valve 91 and the timing mechanism 78. Since unobstructed return of the fluid is impossible at this time, movement of the rod 69 into chamber 73 will be precluded and the upward motion of the ram will be transmitted directly to the valve mechanism 26 by the shipper rod before the ram has moved an appreciable distance. Due to the upward movement of the sleeve member 47 the flow of fluid under pressure to the power cylinder will be reversed and the ram will be again moved downwardly. Since the spring 67 tends to resist upward movement of the sleeve 47, its force will be applied to the fluid in chamber 73 through rod 69 until the sleeve returns to its lowered position on the initial downward movement of the ram. During the time the force of the spring 67 is applied to the fluid in chamber 73 the fluid will be under pressure which tends to cause a flow toward the reservoir 76, the degree of pressure being dependent upon the tension of the spring and the area of the rod 69. When the ram is again stopped in its downward movement by the obstruction, the valve 26 will reverse fluid flow to cause the ram to again move upwardly. This reciprocation will be repeated until fluid is permitted to flow with minimum restriction from the chamber 73 back to the chamber 76.

The timing mechanism 78 includes a plunger 94 which is positioned for sliding movement in the central bore 81 of the cylinder member 80. The plunger 94 is hollow, being closed at its lower end; it is urged toward the lower end of the cylinder 80 by a coil spring 95 also positioned in the bore 81. At its upper end, this coil spring engages the lower surface of a shoulder 96 formed on a piston valve 97 which is also slidably received by the bore 81, the piston valve being disposed adjacent the upper end of the cylinder. The piston has a socket 98 formed in its upper end for the reception of the reduced lower end of a push rod 100, the upper portion of which is slidably received by a cap 101 employed to close the upper end of the reservoir 76. This cap has breather openings 102, the purpose of which is apparent.

The piston valve 97 controls the flow of fluid through a plurality of ports 103 formed in the upper portion of the cylinder 80. Normally, the spring 95 holds the piston valve in an elevated position to block fluid flow through the ports 103, the position of the valve being determined by a shoulder 104 formed adjacent the upper end of the plunger 100 and engaging the under side of the cap 101. When these parts are so positioned, fluid may flow from the reservoir 76 through the groove 82 only, this fluid flowing to the chamber 73 when the rod 69 is withdrawn therefrom as previously set forth. When the ram moves in an upward direction carrying with it the body 72, there will be a tendency to push the rod 69 into the chamber 73 to force the fluid therefrom. This fluid will flow through passage 88, past valve 91 and through passage 89 to the lower end of the compartment 77. Although the valve 91 meters the fluid flowing to compartment 77 to a small quantity, the pressure in compartment 77 will be sufficient to cause the plunger 94 to move upwardly against the action of the spring 95. Since the flow of fluid from the reservoir 73 is impeded, upward movement of the ram will be transmitted through the shipper rod to the valve mechanism 26 to cause a reversal of the direction of fluid flow to the power cylinder. The ram will again move downwardly causing the rod 69 to move out of the chamber 73 and admit more fluid from the reservoir 76 to the chamber 73.

It will be apparent that each reciprocation of the ram will force more fluid into the lower end of the compartment 77 and the plunger 94 will move upwardly step by step. When this plunger 94 has travelled a distance sufficient to partially uncover a port 105 in the cylinder 80, the fluid will flow from the chamber 73 through passage 86A groove 83 and port 105 to the lower end of compartment 77 in a volume greater than is admitted thereto by the valve 91. This increase in fluid flowing into compartment 77 causes the plunger 94 to move suddenly upward until it engages the lower end of a stem 106 depending from the valve member 97. In so moving the plunger will uncover another port 107 in the cylinder 80, which port connects with groove 82. When the port 107 is uncovered, fluid may flow from the chamber 73, through passage 86A, groove 83, port 105, compartment 77, port 107 and groove 82 to the reservoir 76. Since fluid flow between chamber 73 and the reservoir 76 is then possible, telescopic movement of the rod 69 into reservoir 73 may take place without any motion being transmitted from the ram to the valve mechanism 26. It should be observed, that as this movement occurs there is sufficient resistance to the flow of fluid from compartment 77 to the reservoir to create the pressure in the compartment required to hold plunger 94 in position to permit fluid flow through port 107.

As the ram moves upwardly the upper end of the plunger 100 will engage the disc 70 which is clamped to the rod 69 and be depressed against the force of the spring 95 until the upper edge of the valve 97 uncovers ports 103. Fluid may then flow from the lower end of compartment 77 through groove 84 and one of ports 103 and from chamber 73 through passage 86A, groove 83 and another port 103, to the reservoir 76. At this time the pressure in the lower end of compartment 77 will fall and plunger 94 may then return to its normal lowered position ready for a subsequent operation.

Figure 2:
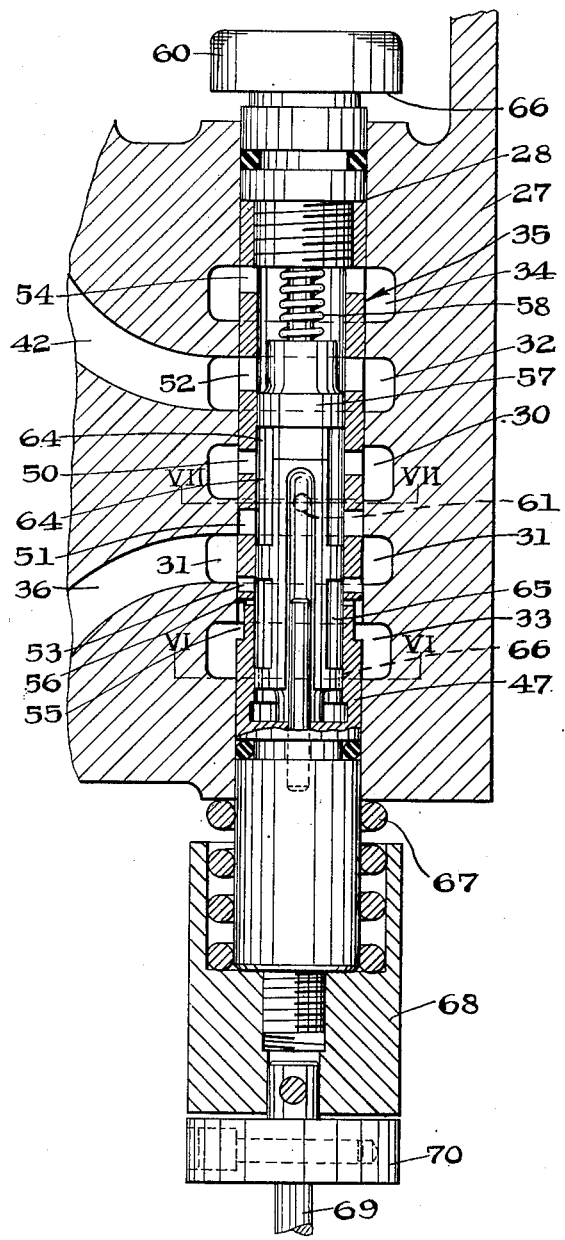
Figure 2 is a vertical longitudinal sectional view taken through a portion of the control mechanism showing the same in one position of movement.
Figure 6:
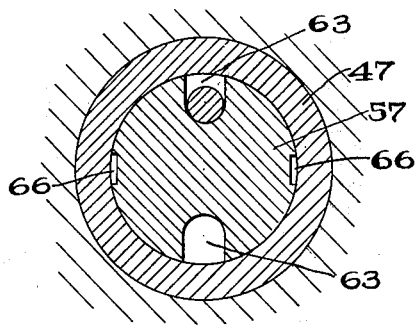
Figures 6 and 7 are detail horizontal sectional views taken on the planes indicated by the lines VI—VI and VII—VII respectively, of Figure 2.
Figure 7:
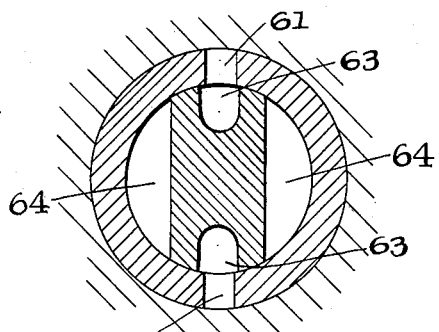
Figure 5:
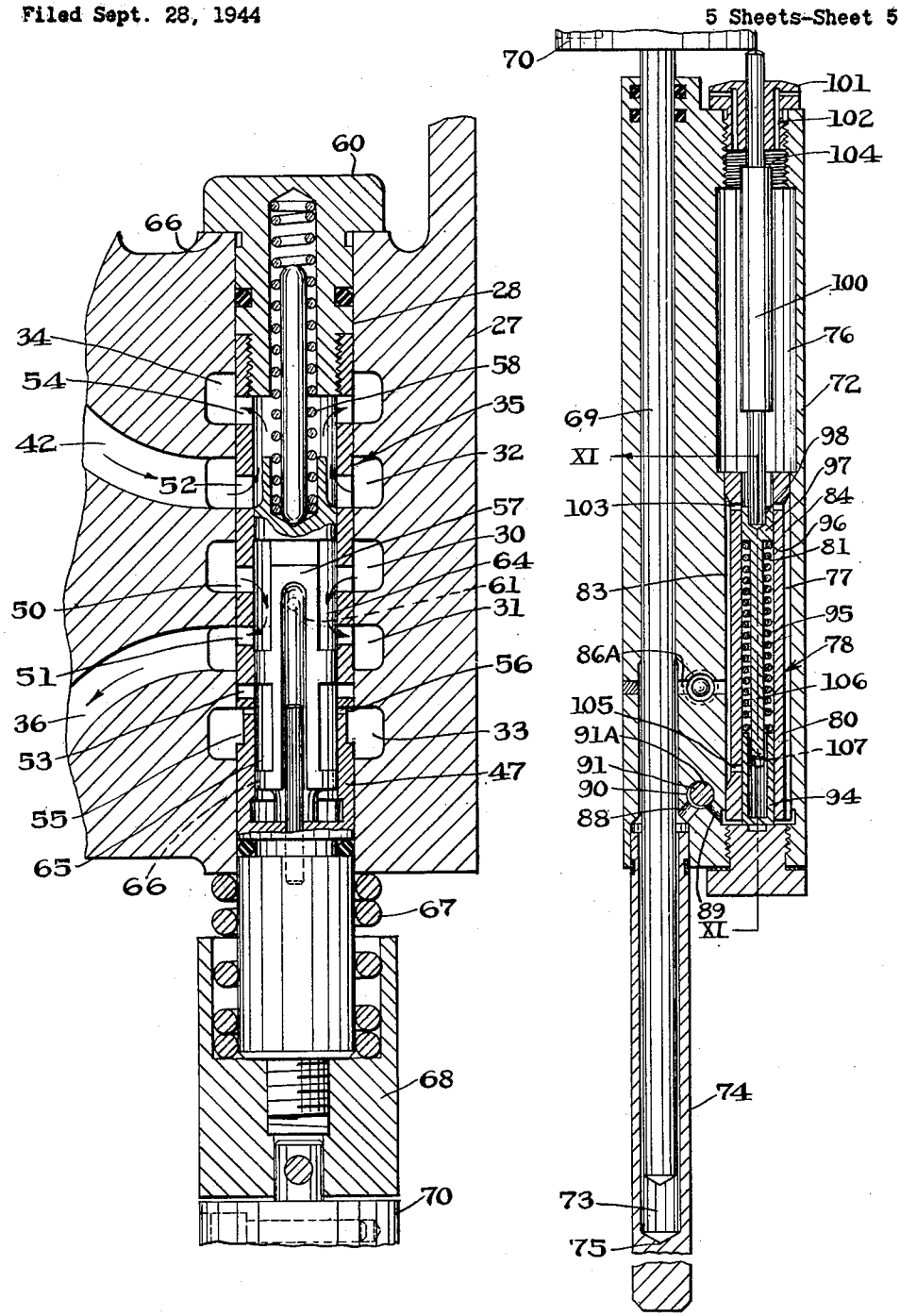
Figure 5 is a vertical longitudinal sectional view of the control mechanism in still another position of movement.

After the plunger has been depressed a distance sufficient to reset the timing mechanism continued upward movement of the ram will raise the valve mechanism 26 to the position shown in Fig. 2 in which an automatic reversal of the direction of fluid flow will be effected to cause the ram to start through another cycle of operation.

From the foregoing it will be apparent that a mechanism has been provided which may be employed in reciprocating a ram or other machine element which will cause such ram or element to perform a working stroke, reciprocate a plurality of times through a limited distance at the termination of the working stroke and return to strating position, all of these operations being performed automatically. Through the provision of a relief valve 71 of suitable type, the ram may be made to exert its maximum capacity or force on the working stroke and on each of the movements in the same direction during the period of short reciprocation.

It may be found desirable to cause the ram or other machine part to move continuously throughout its full length of travel without performing the series of short sharp thrusts or vibrations at the end of the working stroke. It may also be found desirable to retain the particular setting of the valve 91 when this modified operation is employed. To effect such modified operation, use is made of an adjusting device 108 shown particularly in Fig. 10. The adjusting device 108 consists of a screw member 110 which is threadedly received by a plug 111 inserted in the body 72 in registration with the check valve 87. The screw 110 has a pin 112 projecting from the inner end toward the ball of the check valve 87. Normally this pin is spaced from the check valve when the ball is seated. When, however, it is desired to modify the operation of the ram, a lever 113 secured to the screw 110 is swung to move the screw 110 inwardly. The pin 112 will then engage the ball of the check valve and hold the same off its seat and fluid may then flow between reservoir 76 and chamber 73 and return without obstruction. At the time no movement will be transmitted to the valve mechanism 26 by the shipper rod mechanism until the ram has approximately reached its uppermost position determined by the adjustment of the disc 70.

When it is desired to restore the reciprocating or vibrating characteristic of the ram at the end of its working stroke, lever 113 may be swung to its normal position wherein check valve 87 will be released.

As indicated in the objects, it is proposed to employ a press equipped with the control mechanism to compact powdered, granulated or other materials. In such operations, use is made of a matrix 114 or analogous device in which the material 115 to be operated upon is placed. This matrix is located in registration with the ram 41 or a die carried thereby, so that as the ram performs a working stroke, the material 115 will be compressed. Due to the provision of the control mechanism comprising the invention, a series of sharp thrusts at the full force of the press will be imparted to the material 115 to effect the desired compaction thereof.

Because of the particular construction of the control mechanism the same sequence of operations will be secured whether the material 115 is highly compressible or incapable of compression.

The compressed material 115 may be removed from the matrix 114 by a suitable knockout device 116.

While the form of embodiment of the present invention as herein disclosed constitutes a preferred form, it is to be understood that other forms might be adopted, all coming within the scope of the claims which follow.

I claim:

1. In a hydraulic mechanism of the type having a reciprocable member; movable control means for governing the operation of said member, said control means causing movement of said member in a certain direction when disposed in one position; resilient means automatically operative when movement of said member in said certain direction is terminated irrespective of the distance traversed to shift said control means to a second position to cause movement of said member in an opposite direction; motion transmitting means operated in part by said member upon initial movement thereof in such opposite direction to move said control means from the second to the first position to interrupt movement of said member in such opposite direction and resume movement in said certain direction, said resilient means and said motion transmitting means being alternately and repeatedly operated to cause said member to reciprocate through a limited distance rapidly a plurality of times; and interrupting means for rendering said motion transmitting means ineffective after the execution of a predetermined number of reciprocations of said member.

2. In hydraulic apparatus, a reversible fluid motor; a directional control valve operable upon the termination of exhaust flow from said motor when operating in a certain direction to reverse the direction of operation; means including a fluid receiving chamber and a plunger operated by said motor during reverse operation thereof to actuate said control valve to cause said motor to resume operation in said certain direction; and means controlled by the displacement of a predetermined quantity of fluid from said receiver by said plunger for interrupting the operation of said first-mentioned means.

3. In hydraulic apparatus, a reciprocable fluid motor; a directional control valve operable upon the termination of exhaust flow from said motor when operating in a certain direction to reverse the direction of operation; means connected with said control valve and operative when said motor is operating in the reverse direction to actuate said valve to cause said motor to resume operation in said certain direction; and fluid operated means connected with said valve actuating means and responsive to the operation of said motor to regulate the number of direction reversals made by said motor prior to return to initial starting position.

4. In a mechanism of the type having a reciprocable member; movable control means for governing the operation of said member, said control means causing movement of said member in a certain direction when disposed in one position; actuating means operated in part by said member at the termination of movement in said certain direction to alternately position said control means in said first and a second position to cause said member to rapidly reciprocate through a fractional part of its full travel irrespective of the distance traversed thereby in said certain direction; means for rendering said actuating means inoperative after the execution of a predetermined number of reciprocations by said member; and means operative at the termination of movement of said member in a reverse direction to restore the operability of said actuating means.

5. In hydraulic apparatus, a reversible fluid motor; control means for said motor operative to cause alternate forward and reverse operation thereof; means in said control means causing reverse operation of said motor when forward operation thereof is interrupted at any stage; additional means actuated by said motor immediately upon the initiation of operation in the reverse direction to cause a resumption of forward operation; and means connected with said additional means and operative after a predetermined number of operations thereof for rendering the same inoperative.

6. Hydraulic apparatus comprising a power unit having a cylinder and a piston; a source of fluid pressure; valve mechanism between said pressure source and said power unit, said valve mechanism controlling the flow of fluid pressure from said source to said power unit to cause the automatic reciprocation of said piston; actuating means for said valve mechanism, said actuating means having a pair of telescoping members, one thereof being connected with said valve mechanism and the other with said piston, the outer member receiving fluid; a reservoir for receiving the fluid displaced during telescopic movement of said members; means resisting fluid flow in one direction between said outer member and said reservoir; and means operative after the displacement of a predetermined quantity of fluid from said outer member to render said resisting means ineffective.

7. Hydraulic apparatus comprising a power unit having a cylinder and a piston; a source of fluid pressure; valve mechanism between said pressure source and said power unit, said valve mechanism controlling the flow of fluid pressure from said source to said power unit to cause the automatic reciprocation of said piston; actuating means for said valve mechanism, said actuating means having a pair of telescoping members, one thereof being connected with said valve mechanism and the other with said piston, the outer member receiving fluid; a reservoir for receiving the fluid displaced during telescopic movement of said members; means resisting fluid flow in one direction between said outer member and said reservoir; means operative after the displacement of a predetermined quantity of fluid from said outer member to render said resisting means ineffective, and means responsive to the movement of said piston a predetermined distance in a certain direction to restore the effectiveness of said resisting means.

8. A control valve operating device comprising a body provided with socket and a reservoir for the reception of a hydraulic fluid; a passage way providing for unrestricted fluid flow from said reservoir to said socket; a second passageway providing for restricted fluid flow from said socket to said reservoir; a plunger disposed for reciprocation in said socket, movement of said plunger drawing fluid into and displacing it from said socket; means in the last-mentioned passage for accumulating fluid displaced from said socket; and means operative upon the accumulation of a predetermined quantity of fluid to establish unrestricted fluid flow through the second-mentioned passageway.

9. A control valve operating device comprising a body provided with a socket and a fluid reservoir; a plunger disposed for reciprocation in said socket; a passage providing unrestricted fluid flow from said reservoir to said socket during outward movement of said plunger; valve means in said passage preventing reverse fluid flow therethrough; a second passage providing controlled fluid flow from said socket to said reservoir during inward movement of said plunger; and valve means in said second passage resiliently urged into closed position, said valve means being opened by the accumulation of a predetermined quantity of fluid under pressure in said second passage.

10. A control valve operating device comprising a body provided with a socket and a fluid reservoir; a plunger disposed for reciprocation in said socket; a passage providing unrestricted fluid flow from said reservoir to said socket during outward movement of said plunger; valve means in said passage preventing reverse fluid flow therethrough; a second passage providing controlled fluid flow from said socket to said reservoir during inward movement of said plunger; valve means in said second passage resiliently urged into closed position, said valve means being opened by the accumulation of a predetermined quantity of fluid under pressure in said second passage; and means operative upon the movement of said plunger into said socket a predetermined distance to reduce the pressure on said valve means to effect closing movement thereof.

11. In hydraulic apparatus, a power cylinder having a reciprocable piston; a source of fluid pressure; reversing valve mechanism responsive in part to fluid pressure to control the flow of fluid to and from said power cylinder to effect the reciprocation of said piston; means for operating said reversing valve having a second valve; motion-transmitting means operated by initial reverse movement of said piston to actuate said second valve to apply fluid pressure from said source to said reversing valve to shift the same to cause said piston to discontinue reverse operation and resume forward operation; and means for rendering said motion-transmitting mechanism inoperative after a predetermined number of operations thereof to permit the piston to complete its movement in the reverse direction.

12. In hydraulic apparatus, a power cylinder having a reciprocable piston; a source of fluid pressure; reversing valve mechanism responsive in part to fluid pressure to control the flow of fluid to and from said power cylinder to effect the reciprocation of said piston; a valve operative to apply fluid from said source to said reversing valve to move the same to a position to cause forward movement of said piston; a first means operative when forward movement of said piston is interrupted to move said reversing valve to a position to cause reverse movement of said piston; motion-transmitting means operative during initial reverse movement of said piston to cause said valve to again apply fluid pressure to said reversing valve to shift the same to a position to discontinue reverse operation of the piston and resume forward operation; and a third means for rendering said motion-transmitting means inoperative after a predetermined number of operations thereof to permit the piston to complete its movement in the reverse direction.

13. In hydraulic apparatus, a power cylinder having a reciprocable piston; a source of fluid pressure; reversing valve mechanism responsive in part to fluid pressure to control the flow of fluid to and from said power cylinder to effect the reciprocation of said piston; a valve member actuated when reverse movement of said piston is initiated to apply fluid pressure from said source to said reversing valve to interrupt the reverse movement of the piston and cause forward movement thereof; a member movable in increments as said valve member is actuated toward a position to prevent the actuation of said valve member and the interruption of the reverse movement of said piston; and means for resetting said movable member at the termination of reverse movement of said piston.

14. In hydraulic apparatus, a power cylinder having a reciprocable piston; a source of fluid pressure; reversing valve mechanism responsive in part to fluid pressure to control the flow of fluid to and from said power cylinder to effect the reciprocation of said piston; a second valve; motion-transmitting means operated upon initial reverse movement of said piston to move said second valve to a position to apply fluid pressure from said source to said reversing valve to shift the same to a position to discontinue reverse operation of said piston and cause forward operation thereof; an interrupting means for rendering said motion-transmitting means ineffective after a predetermined number of operations thereof, said interrupting means having a member movable in increments as said piston is reciprocated; and means for resetting the movable member of said interrupting means at the termination of reverse movement of said piston.

CECIL E. ADAMS.

REFERENCES CITED

The following references are of record in the file of this patent:

UNITED STATES PATENTS

| Number | Name | Date |
| --- | --- | --- |
| 1,510,205 | Beaty | Sept. 30, 1924 |
| 1,714,545 | Burns | May 28, 1929 |
| 1,779,094 | Heald | Oct. 21, 1930 |
| 2,079,640 | Vickers | May 11, 1937 |
| 2,169,470 | Miller | Aug. 15, 1939 |
| 2,230,335 | Smith | Feb. 4, 1941 |
| 2,324,727 | Shartle | July 20, 1943 |
| 2,346,214 | Flowers | Apr. 11, 1944 |
| 2,348,197 | Ernst et al. | May 9, 1944 |
| 2,349,916 | Stacy | May 30, 1944 |
| 2,367,242 | Stacy | Jan. 16, 1945 |
| 2,368,138 | Hayden | Jan. 30, 1945 |
| 2,446,691 | Clyde | Aug. 10, 1948 |